United States Patent
Moody, III et al.

(10) Patent No.: US 12,303,814 B2
(45) Date of Patent: May 20, 2025

(54) FILTRATION MEDIA

(71) Applicant: Berry Global, Inc., Evansville, IN (US)

(72) Inventors: Ralph A. Moody, III, Mooresville, NC (US); Nyle Bishop, Mooresville, NC (US); Mehmet Selcuk Sinangil, Mooresville, NC (US); Robert Garcia, Alcanar (ES); Rainer Nawroth, L'Aleixar (ES); Victor Gnoatto, Curitiba (BR); Elisabeth Torres Cano, Barcelona (ES)

(73) Assignee: MAGNERA CORPORATION, Charlotte, NC (US)

( * ) Notice: Subject to any disclaimer, the term of this patent is extended or adjusted under 35 U.S.C. 154(b) by 911 days.

(21) Appl. No.: 17/319,336

(22) Filed: May 13, 2021

(65) Prior Publication Data
US 2021/0354062 A1    Nov. 18, 2021

Related U.S. Application Data

(60) Provisional application No. 63/023,951, filed on May 13, 2020.

(51) Int. Cl.
| | | |
|---|---|---|
| *B01D 39/16* | (2006.01) | |
| *A62B 18/08* | (2006.01) | |
| *A62B 23/02* | (2006.01) | |

(52) U.S. Cl.
CPC .......... *B01D 39/163* (2013.01); *A62B 18/084* (2013.01); *A62B 23/025* (2013.01);
(Continued)

(58) Field of Classification Search
CPC ......... B23B 5/02; B23B 5/26; A41D 13/1192; A62B 7/10; A62B 23/025; B01D 39/16; B01D 46/52; B01D 46/54; B01D 46/521; B01D 46/543; B01D 229/0435; B01D 2239/0618; B01D 2239/0622; B01D 2239/0627; B01D 2239/0668; B01D 2250/05; B01D 2250/20
USPC ................. 55/482, 485, 486, 521, 522, 527, 55/DIG. 33, DIG. 35, DIG. 45; 128/206.19, 206.25
See application file for complete search history.

(56) References Cited

U.S. PATENT DOCUMENTS

| | | |
|---|---|---|
| 5,145,727 A | 9/1992 | Potts et al. |
| 5,486,411 A | 1/1996 | Hassenboehler et al. |

(Continued)

FOREIGN PATENT DOCUMENTS

| | | | |
|---|---|---|---|
| KR | 100550512 B1 | 2/2006 | |
| WO | WO 2014143039 A1 * | 9/2014 | ........... A62B 23/025 |

OTHER PUBLICATIONS

International Search Report and Written Opinion of corresponding international application No. PCT/US2021/032190 filed on May 13, 2021, all enclosed pages cited.
(Continued)

*Primary Examiner* — Minh Chau T Pham
(74) *Attorney, Agent, or Firm* — BURR & FORMAN LLP

(57) ABSTRACT

A filtration media including at least a first nonwoven fabric having at least one meltblown layer in provided. The at least one meltblown layer includes a plurality of meltblown fibers having an average diameter from about 1 to about 5 microns. Methods of making a filtration media are also provided. Facemasks including such filtration media are also provided.

32 Claims, 4 Drawing Sheets

(52) U.S. Cl.
CPC ............... *B01D 2239/0435* (2013.01); *B01D 2239/0618* (2013.01); *B01D 2239/0622* (2013.01); *B01D 2239/0627* (2013.01); *B01D 2239/0668* (2013.01); *B01D 2239/086* (2013.01); *B01D 2239/10* (2013.01); *B01D 2239/1258* (2013.01)

(56) References Cited

U.S. PATENT DOCUMENTS

| | | | |
|---|---|---|---|
| 5,593,768 | A | 1/1997 | Gessner |
| 5,714,067 | A | 2/1998 | Sorrick |
| 8,091,551 | B2 | 1/2012 | Messier |
| 8,303,693 | B2* | 11/2012 | Leung ............... B01D 39/1623 55/DIG. 35 |
| 8,381,727 | B2* | 2/2013 | Matich ............... A62B 18/00 128/206.25 |
| 8,430,100 | B2* | 4/2013 | Reese ............... A41D 13/1107 128/206.19 |
| 9,320,923 | B2* | 4/2016 | Koehler ............ A41D 13/1146 |
| 2006/0144403 | A1 | 7/2006 | Messier |
| 2008/0035153 | A1 | 2/2008 | Lin |
| 2009/0272084 | A1* | 11/2009 | Healey ............... B01D 46/522 55/487 |
| 2010/0107881 | A1* | 5/2010 | Healey ............... B01D 63/14 55/486 |
| 2010/0129628 | A1 | 5/2010 | Young |
| 2010/0313890 | A1 | 12/2010 | Messier |
| 2015/0090658 | A1* | 4/2015 | Branham ............ D04H 1/728 428/394 |
| 2015/0173436 | A1 | 6/2015 | Tsuei |
| 2016/0175752 | A1* | 6/2016 | Jaganathan ........ B01D 39/1623 55/486 |
| 2017/0312558 | A1 | 11/2017 | Wang |
| 2019/0000162 | A1 | 1/2019 | Houde |
| 2021/0322908 | A1* | 10/2021 | Gopal ................. B32B 5/269 |
| 2023/0167590 | A1* | 6/2023 | Malocho ............ D04H 1/56 55/495 |

OTHER PUBLICATIONS

Second Written Opinion of corresponding international application No. PCT/US2021/032190 mailed on Apr. 22, 2022, all enclosed pages cited.

Third Written Opinion of corresponding international application No. PCT/US2021/032190 mailed on Jul. 5, 2022, all enclosed pages cited.

Office Action (with English Translation) issued in corresponding Korean Patent Application No. 10-2022-7039195 mailed Jan. 17, 2025, all pages cited in its entirety.

* cited by examiner

FILTRATION MEDIA

CROSS-REFERENCE TO RELATED APPLICATIONS

This application claims priority under 35 U.S.C. § 119 (e) to U.S. Provisional Application No. 63/023,951 filed May 13, 2020, which is expressly incorporated by reference herein in its entirety.

TECHNICAL FIELD

Embodiments of the presently-disclosed invention relate generally to filtration media including at least one nonwoven fabric layer (e.g., a plurality of individual nonwoven fabric layers), in which the at least one nonwoven fabric layer includes a relatively low basis weight of meltblown fibers.

BACKGROUND

Facemasks and respirators for filtering air inhaled by an individual have been in use for many years. There has recently been an increased awareness and concern for preventing contamination and infection of the public and health care personnel by airborne pathogens. Therefore, it has become highly desirable to prevent the spread of infections from person to person, from patient to health care worker and vice versa by preventing or mitigating inhalation or exhalation of airborne infectious aerosols and/or particulate matter. With recent outbreaks, for example, of the SARS virus and the COVID-19 virus, the spread of such airborne pathogens and has become an even greater concern on the minds of public health officials due to their potential undesirable impact(s).

Most facemasks are constructed from three (3) layers bonded together as a single fabric construct. The typical construction for these single fabric constructs include two outermost spunbond layers from about 25 to about 30 gsm and an internal meltblown layer from about 20 to about 25 gsm. From a manufacturing perspective, the aforementioned three (3) layers are unwound from their respective feed roll and laminated together on a facemask machine. From a roll goods perspective, the outer spunbond layers are easily and quickly produced with lots of capacity in the market. The meltblown layer, however, is more limited in capacity in most regions, and becomes the bottleneck for the production of suitable facemasks in pandemic times.

Additionally, some such single fabric constructs have been shown to be marginally successful. In particular, such single fabric constructs (e.g., a single 50 gsm SSMMS fabric) may achieve good bacterial filtration efficiency, but generally are unable to maintain their breathability levels or pressure drop values (e.g., increased pressure drop is associated with difficulty in inhaling and exhaling air for a user) below the upper limits for Level 1, 2, and 3 grades.

There remains a need, therefore, for filtration media that meets or exceeds Level 1 requirements in the U.S. and/or meets or exceeds Type 1 requirement in Europe, while using a reduced amount of total meltblown content. There also remains a need for a method of making such a filtration media that includes a reduced amount of total meltblown content such that a greater number of facemasks may ultimately be produced from a finite (and often limited) amount of meltblown.

SUMMARY OF INVENTION

One or more embodiments of the invention may address one or more of the aforementioned problems. Certain embodiments according to the invention provide a filtration media including at least a first nonwoven fabric (e.g., a plurality of nonwoven fabrics) having a structure according to the any one of the following:

$$S1_a\text{-}M1_b\text{-}S2_c; \text{ and} \qquad \text{(Structure 1)}$$

$$S1_a\text{-}M1_b\text{-}S3_d\text{-}M2_e\text{-}S2_c; \qquad \text{(Structure 2)}$$

wherein,
'M1' comprises a first meltblown layer or a first group of multiple meltblown layers;
'M2' comprises a second meltblown layer or a second group of multiple meltblown layers;
'S1' comprises a first spunbond layer or a first group of multiple spunbond layers;
'S2' comprises a second spunbond layer or a second group of multiple spunbond layers;
'S3' comprises a third spunbond layer or a third group of multiple spunbond layers;
'a' represents the number of layers of 'S1' and is independently selected from 1, 2, 3, 4, and 5;
'b' represents the number of layers of 'M1' and is independently selected from 1, 2, 3, 4, and 5;
'c' represents the number of layers of 'S2' and is independently selected from 1, 2, 3, 4, and 5;
'd' represents the number of layers of 'S3' and is independently selected from 1, 2, 3, 4, and 5;
and
'e' represents the number of layers of 'M2' and is independently selected from 1, 2, 3, 4, and 5. In accordance with certain embodiments of the invention, the first nonwoven fabric includes at least one meltblown layer (M1) including a plurality of meltblown fibers having an average diameter from about 1 to about 5 microns, such as at least about any of the following: 1, 1.2, 1.4, 1.6, 1.8, 2, 2.2, 2.4, 2.6, 2.8, and 3 microns, and/or at most about any of the following: 5, 4.8, 4.5, 4.2, 4, 3.8, 3.5, 3.2, and 3 microns.

In another aspect, the present invention provides a method of making a filtration media comprising overlaying at least a first nonwoven fabric and a second nonwoven fabric in a face-to-face configuration in a z-direction to form a multi-layer fabric filtration media. The method may further comprise attaching the first nonwoven fabric and the second nonwoven fabric along at least a portion of a periphery of the multi-layer fabric filtration media. In accordance with certain embodiments of the invention, each of the first nonwoven fabric and the second nonwoven fabric have a structure according to the any one of the following:

$$S1_a\text{-}M1_b\text{-}S2_c; \text{ and} \qquad \text{(Structure 1)}$$

$$S1_a\text{-}M1_b\text{-}S3_d\text{-}M2_e\text{-}S2_c; \qquad \text{(Structure 2)}$$

wherein,
'M1' comprises a first meltblown layer or a first group of multiple meltblown layers;
'M2' comprises a second meltblown layer or a second group of multiple meltblown layers;
'S1' comprises a first spunbond layer or a first group of multiple spunbond layers;
'S2' comprises a second spunbond layer or a second group of multiple spunbond layers;
'S3' comprises a third spunbond layer or a third group of multiple spunbond layers;
'a' represents the number of layers of 'S1' and is independently selected from 1, 2, 3, 4, and 5;
'b' represents the number of layers of 'M1' and is independently selected from 1, 2, 3, 4, and 5;

'c' represents the number of layers of 'S2' and is independently selected from 1, 2, 3, 4, and 5;

'd' represents the number of layers of 'S3' and is independently selected from 1, 2, 3, 4, and 5; and 'e' represents the number of layers of 'M2' and is independently selected from 1, 2, 3, 4, and 5. In accordance with certain embodiments of the invention, the first nonwoven fabric includes at least one meltblown layer (M1) including a plurality of meltblown fibers having an average diameter from about 1 to about 5 microns, such as at least about any of the following: 1, 1.2, 1.4, 1.6, 1.8, 2, 2.2, 2.4, 2.6, 2.8, and 3 microns, and/or at most about any of the following: 5, 4.8, 4.5, 4.2, 4, 3.8, 3.5, 3.2, and 3 microns.

In yet another aspect, the present invention provides a facemask comprising a central body portion comprising a nonwoven, such as those described and disclosed herein, and a periphery region surrounding the central body portion. The facemask may also include at least one strap attached directly or indirectly to the periphery region and/or the central body portion.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1:
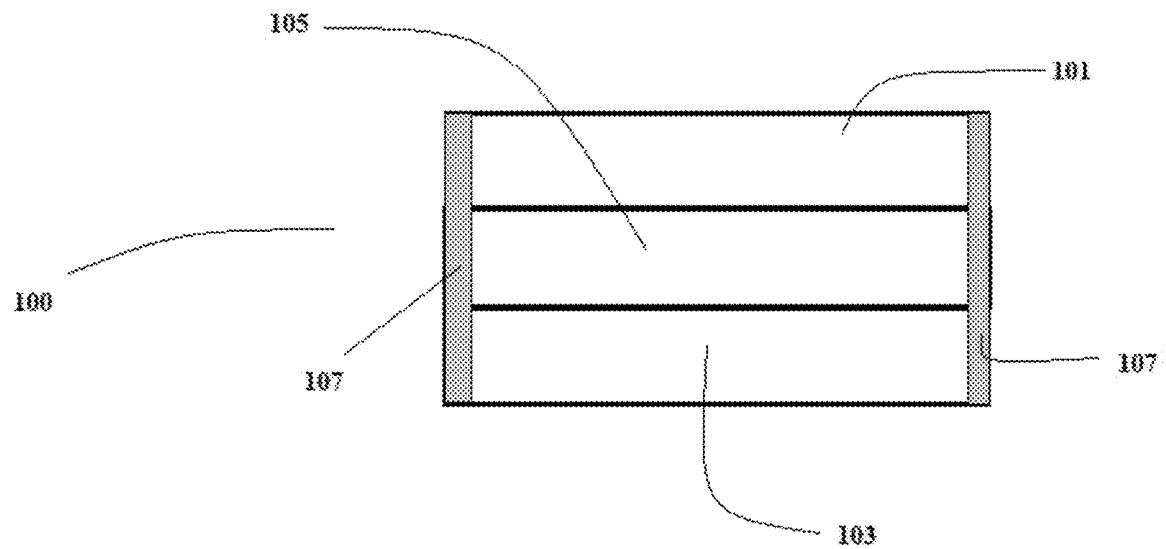
FIG. 1 illustrates a side view of filtration media in accordance with certain embodiments of the invention.

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The presently-disclosed invention relates generally to filtration media suitable for application in facemask applications, such as Level 1 (U.S.) and Type 1 (Europe) facemasks. In accordance with certain embodiments of the invention, for instance, the filtration media may be easily produced, publicly distributed, and worn by a multitude of the general public to prevent or mitigate the risks associated with the inhalation, exhalation, and/or transmission of airborne pathogens. In accordance with certain embodiment of the invention, the filtration media may comprise one or a plurality of separate nonwoven fabrics, which may function in union to provide the desired filtration efficiency, desirable bacterial filtration efficiency, and desirably pressure drop. For example, the filtration media may comprise a plurality of separate nonwoven fabrics that may be directly or indirectly joined together along at least part of a shared periphery of a stack (e.g., the plurality of nonwoven fabrics may be positioned of overlie one another in a face-to-face orientation in a z-direction) of the plurality of nonwoven fabrics. In accordance with certain embodiments of the invention, each of the plurality of nonwoven fabrics may comprise a respective central body portion which is not directly joined or otherwise bonded to any adjacent central body portion. The central body portions, for example, may each independently comprise at least the 25%, 50%, 75%, 90%, or 95% of the innermost surface area of a face of the respective nonwoven fabric. In accordance with certain embodiments of the invention, the unbonded or substantially unbonded central body portions impart an ease of wear and/or comfort to the user upon use in a facemask application.

In accordance with certain embodiments of the invention, the presently-disclosed invention also relates to a more efficient use of meltblown material within a filtration media. For example, filtration media in accordance with certain embodiments of the invention may enable improved or similar filtration efficiency, bacterial filtration efficiency, and/or pressure drop while utilizing a total meltblown content that is noticeably less than traditional filtration media. In accordance with certain embodiments of the invention, the filtration media includes a reduced amount of total meltblown content such that a greater number of facemasks may ultimately be produced from a finite (and often limited) amount of meltblown. For example, facemasks utilizing filtration media in accordance with certain embodiments of the invention required a reduced amount of meltblown material, which enables the production of many more facemasks for a given supply of meltblown suitable for filtration applications.

As discussed in more detail below, certain embodiments in accordance with the invention comprise one or more nonwoven fabrics having a general spunbond-meltblown-spunbond (S-M-S) construction, in which the number of spunbond layers and meltblown layers can very as noted below. For example, one or more of the plurality of nonwoven fabrics of the filtration media may comprise a SSMMS construct. As noted above, the meltblown portion of the nonwoven fabrics may be relatively low (e.g., less than 20%, less than 16%, less than 12%, less than 10%, etc.) In accordance with certain embodiments of the invention, for example, the filtration media may comprise a plurality of nonwoven fabrics in which each nonwoven fabric has a basis weight below about 40 gsm, 35 gsm, 30 gsm, 25 gsm, or 20 gsm, while also utilizing a reduced amount of meltblown within each of the plurality of nonwoven fabrics. In accordance with certain embodiments of the invention, the filtration media may achieve a lower pressure drop than a single layer filtration media comprising the same basis weight. In addition to providing a reduced pressure drop per basis weight, certain embodiments in accordance with the invention enable a more easily and/or thoroughly electrically charged filtration media since it is generally more difficult to electrically charge a higher basis weight single layer fabric construction as compared to the ability to independently electrically charge each of the nonwoven fabrics.

In accordance with certain embodiments of the invention, the filtration media may be suitable for performance in general purpose particulate facemasks, Level 1 facemasks, Level 2 facemasks, and Level 3 facemasks.

The terms "substantial" or "substantially" may encompass the whole amount as specified, according to certain embodiments of the invention, or largely but not the whole amount specified (e.g., 95%, 96%, 97%, 98%, or 99% of the whole amount specified) according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material. The term "polymer" or "polymeric" shall also include polymers made from various catalyst systems including, without limitation, the Ziegler-Natta catalyst system and the metallocene/single-site catalyst system. The term "polymer" or "polymeric" shall also include, in accordance with certain embodiments of the invention, polymers produced by fermentation process or biosourced.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, needle-punching, hydroentangling, air-laid, and bonded carded web processes. A "nonwoven web", as used herein, may comprise a plurality of individual fibers that have not been subjected to a consolidating process.

The terms "fabric" and "nonwoven fabric", as used herein, may comprise a web of fibers in which a plurality of the fibers are mechanically entangled or interconnected, fused together, and/or chemically bonded together. For example, a nonwoven web of individually laid fibers may be subjected to a bonding or consolidation process to bond at least a portion of the individually fibers together to form a coherent (e.g., united) web of interconnected fibers.

The term "consolidated" and "consolidation", as used herein, may comprise the bringing together of at least a portion of the fibers of a nonwoven web into closer proximity or attachment there-between (e.g., thermally fused together, chemically bonded together, and/or mechanically entangled together) to form a bonding site, or bonding sites, which function to increase the resistance to external forces (e.g., abrasion and tensile forces), as compared to the unconsolidated web. The bonding site or bonding sites, for example, may comprise a discrete or localized region of the web material that has been softened or melted and optionally subsequently or simultaneously compressed to form a discrete or localized deformation in the web material. Furthermore, the term "consolidated" may comprise an entire nonwoven web that has been processed such that at least a portion of the fibers are brought into closer proximity or attachment there-between (e.g., thermally fused together, chemically bonded together, and/or mechanically entangled together), such as by thermal bonding or mechanical entanglement (e.g., hydroentanglement) as merely a few examples. Such a web may be considered a "consolidated nonwoven", "nonwoven fabric" or simply as a "fabric" according to certain embodiments of the invention.

The term "layer", as used herein, may comprise a generally recognizable combination of similar material types and/or functions existing in the X-Y plane.

The term "spunbond", as used herein, may comprise fibers which are formed by extruding molten thermoplastic material as filaments from a plurality of fine, usually circular, capillaries of a spinneret with the diameter of the extruded filaments then being rapidly reduced. According to an embodiment of the invention, spunbond fibers are generally not tacky when they are deposited onto a collecting surface and may be generally continuous as disclosed and described herein. It is noted that the spunbond used in certain composites of the invention may include a nonwoven described in the literature as SPINLACE®.

As used herein, the term "continuous fibers" refers to fibers which are not cut from their original length prior to being formed into a nonwoven web or nonwoven fabric. Continuous fibers may have average lengths ranging from greater than about 15 centimeters to more than one meter, and up to the length of the web or fabric being formed. For example, a continuous fiber, as used herein, may comprise a fiber in which the length of the fiber is at least 1,000 times larger than the average diameter of the fiber, such as the length of the fiber being at least about 5,000, 10,000, 50,000, or 100,000 times larger than the average diameter of the fiber.

The term "meltblown", as used herein, may comprise fibers formed by extruding a molten thermoplastic material through a plurality of fine die capillaries as molten threads or filaments into converging high velocity, usually hot, gas (e.g. air) streams which attenuate the filaments of molten thermoplastic material to reduce their diameter, which may be to microfiber diameter, according to certain embodiments of the invention. According to an embodiment of the invention, the die capillaries may be circular. Thereafter, the meltblown fibers are carried by the high velocity gas stream and are deposited on a collecting surface to form a web of randomly disbursed meltblown fibers. Meltblown fibers may comprise microfibers which may be continuous or discontinuous and are generally tacky when deposited onto a collecting surface. Meltblown fibers, however, are shorter in length than those of spunbond fibers.

All whole number end points disclosed herein that can create a smaller range within a given range disclosed herein are within the scope of certain embodiments of the invention. By way of example, a disclosure of from about 10 to about 15 includes the disclosure of intermediate ranges, for example, of: from about 10 to about 11; from about 10 to about 12; from about 13 to about 15; from about 14 to about 15; etc. Moreover, all single decimal (e.g., numbers reported to the nearest tenth) end points that can create a smaller range within a given range disclosed herein are within the scope of certain embodiments of the invention. By way of example, a disclosure of from about 1.5 to about 2.0 includes the disclosure of intermediate ranges, for example, of: from about 1.5 to about 1.6; from about 1.5 to about 1.7; from about 1.7 to about 1.8; etc.

Certain embodiments according to the invention provide a filtration media including at least a first nonwoven fabric (e.g., a plurality of nonwoven fabrics) having a structure according to the any one of the following:

$$S1_a\text{-}M1_b\text{-}S2_c;\text{ and} \quad\quad\text{(Structure 1)}$$

$$S1_a\text{-}M1_b\text{-}S3_d\text{-}M2_e\text{-}S2_c; \quad\quad\text{(Structure 2)}$$

wherein,
'M1' comprises a first meltblown layer or a first group of multiple meltblown layers;
'M2' comprises a second meltblown layer or a second group of multiple meltblown layers;
'S1' comprises a first spunbond layer or a first group of multiple spunbond layers;
'S2' comprises a second spunbond layer or a second group of multiple spunbond layers;
'S3' comprises a third spunbond layer or a third group of multiple spunbond layers;
'a' represents the number of layers of 'S1' and is independently selected from 1, 2, 3, 4, and 5;
'b' represents the number of layers of 'M1' and is independently selected from 1, 2, 3, 4, and 5;
'c' represents the number of layers of 'S2' and is independently selected from 1, 2, 3, 4, and 5;
'd' represents the number of layers of 'S3' and is independently selected from 1, 2, 3, 4, and 5;
and
'e' represents the number of layers of 'M2' and is independently selected from 1, 2, 3, 4, and 5. In accordance with certain embodiments of the invention, the first nonwoven fabric includes at least one meltblown layer (M1) including a plurality of meltblown fibers having an average diameter from about 1 to about 5 microns, such as at least about any of the following: 1, 1.2, 1.4, 1.6, 1.8, 2, 2.2, 2.4, 2.6, 2.8, and 3 microns, and/or at most about any of the following: 5, 4.8, 4.5, 4.2, 4, 3.8, 3.5, 3.2, and 3 microns. In accordance with certain embodiments of the invention, each meltblown layer includes a respective plurality of meltblown fibers having an average diameter from about 1 to about 5 microns, such as at least about any of the following: 1, 1.2, 1.4, 1.6, 1.8, 2, 2.2, 2.4, 2.6, 2.8, and 3 microns, and/or at most about any of the following: 5, 4.8, 4.5, 4.2, 4, 3.8, 3.5, 3.2, and 3 microns.

By way of example only, the filtration media may comprise a plurality of nonwoven fabrics in which each nonwoven fabric has a structure according to Structure 1 or Structure 2. For example only, each nonwoven fabric may has a structure according to Structure 1, in which 'a' is 2, 'b' is 2, and 'c' is 1 to provide a SSMMS structure. By way of another example, the filtration media may comprise a first nonwoven fabric having a structure according to Structure 1 and a second nonwoven fabric having a structure according to Structure 2 or according to Structure 1, but where one or more of the values for 'a', 'b', or 'c' may be different than that of the first nonwoven structure.

As noted above, the filtration media may comprise a plurality of nonwoven fabrics in which each nonwoven fabric has a structure according to Structure 1 or Structure 2. For example, the filtration media may include from 1 to about 10 nonwoven fabric layers forming the filtration media. For instance, the filtration media may comprise a first nonwoven fabric, a second nonwoven fabric, and a third nonwoven fabric, in which each nonwoven fabric may independently have a structure according to Structure 1 or Structure 2. The filtration media may also, for example, include a fourth nonwoven fabric having a structure according to Structure 1 or Structure 2, and a fifth nonwoven fabric having a structure according to Structure 1 or Structure 2.

In accordance with certain embodiments of the invention, each of the plurality of nonwoven fabrics (e.g., nonwoven fabrics according to Structure 1 and/or Structure 2) may independently comprise a basis weight from about 5 to about 50 gsm, such as at least about any of the following: 5, 8, 10, 11, 13, 15, 18, 20, 22, 25, 28, and 30 gsm and/or at most about any of the following: 50, 48, 45, 42, 40, 38, 35, 32, 30, 28, 25, 22, and 20 gsm. For example, the first nonwoven fabric may have a basis weight from about 5 to about 50 gsm, such as at least about any of the following: 5, 8, 10, 11, 13, 15, 18, 20, 22, 25, 28, and 30 gsm and/or at most about any of the following: 50, 48, 45, 42, 40, 38, 35, 32, 30, 28, 25, 22, and 20 gsm. Independently of the basis weight of any other nonwoven fabrics in the filtration media, the second nonwoven fabric may have a basis weight from about 5 to about 50 gsm, such as at least about any of the following: 5, 8, 10, 11, 13, 15, 18, 20, 22, 25, 28, and 30 gsm and/or at most about any of the following: 50, 48, 45, 42, 40, 38, 35, 32, 30, 28, 25, 22, and 20 gsm. Independently of the basis weight of any other nonwoven fabrics in the filtration media, the third nonwoven fabric (if present) may have a basis weight from about 5 to about 50 gsm, such as at least about any of the following: 5, 8, 10, 11, 13, 15, 18, 20, 22, 25, 28, and 30 gsm and/or at most about any of the following: 50, 48, 45, 42, 40, 38, 35, 32, 30, 28, 25, 22, and 20 gsm. Independently of the basis weight of any other nonwoven fabrics in the filtration media, the fourth nonwoven fabric (if present) may have a basis weight from about 5 to about 50 gsm, such as at least about any of the following: 5, 8, 10, 11, 13, 15, 18, 20, 22, 25, 28, and 30 gsm and/or at most about any of the following: 50, 48, 45, 42, 40, 38, 35, 32, 30, 28, 25, 22, and 20 gsm. Independently of the basis weight of any other nonwoven fabrics in the filtration media, the fifth nonwoven fabric (if present) may have a basis weight from about 5 to about 50 gsm, such as at least about any of the following: 5, 8, 10, 11, 13, 15, 18, 20, 22, 25, 28, and 30 gsm and/or at most about any of the following: 50, 48, 45, 42, 40, 38, 35, 32, 30, 28, 25, 22, and 20 gsm. For example, the first nonwoven fabric may have a first basis weight and the second nonwoven fabric may have a second basis weight, in which the first basis weight is different than the second basis weight. Alternatively, each of the plurality of nonwoven fabrics comprise the same basis weight.

In accordance with certain embodiments of the invention, the plurality of nonwoven fabrics may be provided in a configuration in which they are stacked upon each other in a face-to-face orientation in a z-direction, which is perpendicular to both a machine direction and cross-direction of the respective nonwoven fabrics, to provide a multi-fabric filtration media. The plurality of nonwoven fabrics, in accordance with certain embodiments of the invention, may be directly or indirectly bonded to each other along at least a portion of a periphery of the multi-fabric filtration media. For example, the plurality of nonwoven fabrics may be stitch bonded, thermally bonded, ultrasonically bonded, or adhesively bonded to each other along at least a portion of the periphery of the multi-fabric filtration media. By way of example only, the multi-fabric filtration media may comprise a continuous bond site located completely along the periphery of the multi-layer fabric filtration media. Alternatively, the multi-fabric filtration media may comprise a plurality of discrete bond sites located at least partially (or completely) along the periphery of the multi-layer fabric filtration media. In accordance with certain embodiments of the invention, the multi-fabric filtration media is devoid of any additional bond sites other than those associated along the periphery of the multi-fabric filtration media.

FIG. 1, for instance, illustrates a side view of filtration media in accordance with certain embodiments of the invention. As shown in FIG. 1, the filtration media 100 may comprise three separate nonwoven fabrics. As shown in FIG. 1, the filtration media 100 includes a first outmost nonwoven fabric 101 having a structure according to Structure 1 or Structure 2, a second outmost nonwoven fabric 103 having a structure according to Structure 1 or Structure 2, and an interior nonwoven fabric 105 having a structure according to Structure 1 or Structure 2. FIG. 1 illustrates bond sites 107 along the edges or periphery of the plurality of nonwoven fabrics (e.g., the multi-fabric filtration media).

Figure 2:
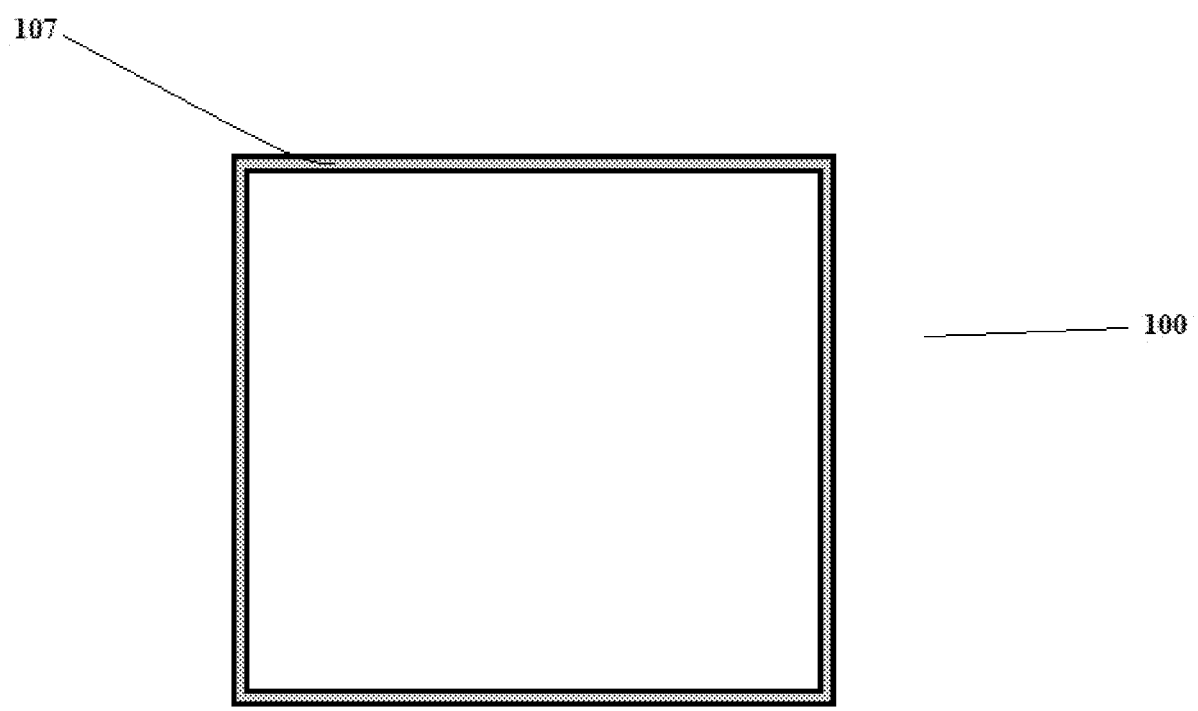
FIG. 2 illustrates a top view of the filtration media of FIG. 1 having a continuous bond about the entire periphery of the filtration media.
Figure 3:
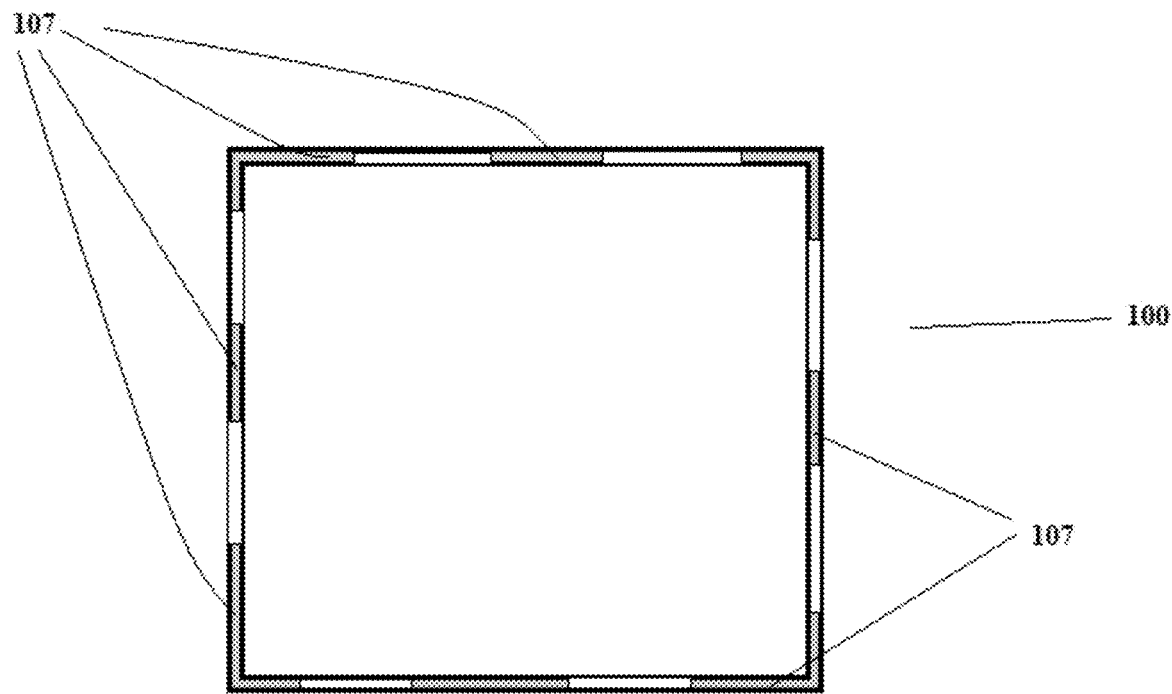
FIG. 3 illustrates a top view of the filtration media of FIG. 1 having a discontinuous bond about the entire periphery of the filtration media.
Figure 4:
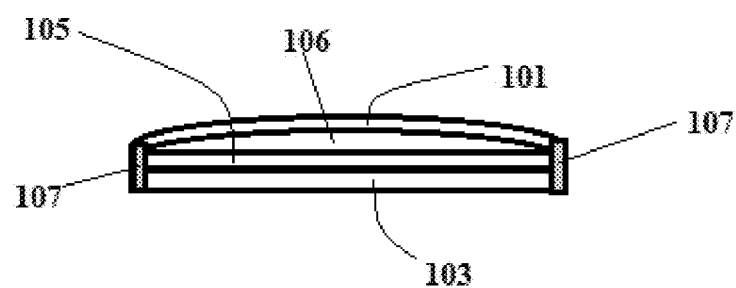
FIG. 4 illustrates a side view of filtration media and visualizes the relative freedom of movement in the z-direction between a first nonwoven fabric and an adjacent nonwoven fabric.

FIG. 2 illustrates a top view of the filtration media 100 of FIG. 1 having a continuous bond 107 about the entire periphery of the filtration media. FIG. 3 illustrates a top view of the filtration media 100 of FIG. 1 having a plurality of discontinuous bond sites 107 about the entire periphery of the filtration media. FIG. 4 illustrates a side view of filtration media 100 and exemplifies the relative freedom of movement in the z-direction between a first nonwoven fabric 101 and an adjacent nonwoven fabric 105. In this regard, the edge portions or periphery of the first nonwoven fabric 101 and the second nonwoven fabric 105 are joined by bond sites 107, while the central body portions are relatively free to move or slide with respect to each other. For instance, the first nonwoven fabric 101 may relax in a position slightly apart from the second nonwoven fabric 105 in a manner to define a gap 106 between the two nonwoven fabrics. In accordance with certain embodiments of the invention, a gap between each adjacent fabric, for example, at respective central body portions of the adjacent nonwoven fabrics may be present between adjacent nonwoven fabrics.

In accordance with certain embodiments of the invention, one or more (e.g., each) of the plurality of nonwoven fabrics may independently comprise from about 5% by weight to about 20% by weight of a plurality of meltblown fibers, such as at least about any of the following: 5, 8, 10, 12, and 15% by weight and/or at most about any of the following: 20, 18, 16, and 15% by weight. Additionally or alternatively, one or more (e.g., each) of the plurality of nonwoven fabrics may independently comprise from about 1 to about 5 gsm of the plurality of meltblown fibers, such as at least about any of the following: 1, 1.2, 1.4, 1.6, 1.8, 2, 2.2, 2.4, 2.6, 2.8, and 3 gsm and/or at most about any of the following: 5, 4.8, 4.5, 4.2, 3.8, 3.5, 3.2, and 3 gsm.

In accordance with certain embodiments of the invention, the filtration media comprises from about 5% by weight to about 20% by weight of the plurality of meltblown fibers, such as at least about any of the following: 5, 8, 10, 12, and 15% by weight and/or at most about any of the following: 20, 18, 16, and 15% by weight. Additionally or alternatively, the filtration media comprises from about 1 to about 15 gsm of the plurality of meltblown fibers, such as at least about any of the following: 1, 2, 3, 5, 6, 8, and 10 gsm and/or at most about any of the following: 15, 12, 10, and 8 gsm.

In accordance with certain embodiments of the invention, the filtration media may comprise a total meltblown content including a plurality of meltblown fibers having an average diameter from about 1 to about 5 microns, such as at least about any of the following: 1, 1.2, 1.4, 1.6, 1.8, 2, 2.2, 2.4, 2.6, 2.8, and 3 microns, and/or at most about any of the following: 5, 4.8, 4.5, 4.2, 4, 3.8, 3.5, 3.2, and 3 microns.

In accordance with certain embodiments of the invention, the plurality of meltblown fibers may comprise a synthetic polymer, such as a polyolefin, a polyester, a polyamide, or any combination thereof. For instance, the polyolefin may comprises a polypropylene, a polypropylene copolymer, a polyethylene, a polyethylene copolymer, or any combination thereof.

In accordance with certain embodiments of the invention, the filtration media may comprise a total spunbond content including a plurality of spunbond fibers having an average diameter from about 12 to about 30 microns, such as at least about any of the following: 12, 14, 16, 18, and 20 microns, and/or at most about any of the following: 30, 28, 25, 22, 20, and 18 microns.

In accordance with certain embodiments of the invention, the filtration media includes a first outer spunbond layer including a first plurality of continuous spunbond fibers and a second outer spunbond layer including a second plurality of continuous spunbond fibers, wherein the first plurality of spunbond fibers, the second plurality of spunbond fibers, or both have an average diameter from about 12 to about 30 microns, such as at least about any of the following: 12, 14, 16, 18, and 20 microns, and/or at most about any of the following: 30, 28, 25, 22, 20, and 18 microns.

In accordance with certain embodiments of the invention, the first plurality of spunbond fibers, the second plurality of spunbond fibers, or both independently comprise a synthetic polymer, such as a polyolefin, a polyester, a polyamide, or any combination thereof. For example, the polyolefin may comprise a polypropylene, a polypropylene copolymer, a polyethylene, a polyethylene copolymer, or any combination thereof.

In accordance with certain embodiments of the invention, the filtration media has a pressure drop of at most 60 Pa/cm$^2$ as determined by EN14683 or F2100-19, such as at most about any of the following 60, 55, 50, 45, 40, 35, and 30 Pa/cm$^2$ as determined by EN14683 F2100-19 and/or at least about any of the following: 10, 15, 20, 25, 30, and 35 Pa/cm$^2$ as determined by EN14683 F2100-19.

In accordance with certain embodiments of the invention, the filtration media has a Bacterial Filtration Efficiency (BFE) for particles having a size of, for example, 3 microns of at least 95%, such as at least 96%, at least 97%, at least 98%, or at least 99% as determined by ASTM F2101-19 or EN14683. The BFE of a filter material is generally arrived at by determining the percentage of bacteria, such as *Staphylococcus aureus* or *Bacillus stearothermophilus*, that is able to migrate through the filter material under normal condition. The fewer bacteria which are able to pass through the filter material, the higher the BFE.

In accordance with certain embodiments of the invention, the filtration media has an air permeability from about 20 to about 85 cfm measured at 125 Pa pressure differential with a 38 cm$^2$ head (volume) Textest instrument according to ASTM D737, such as at most about any of the following: 85, 80, 75, 70, 65, 60, 55, 50, 45, 40, and 35 cfm and/or at least about any of the following: 20, 25, 30, 35, and 40 cfm.

In accordance with certain embodiments of the invention, one or more of the individual layers of one or more of the nonwoven fabrics may comprise electrically charged fibers. For instance, electrically charged fibers may include fibers that possess an electric charge that is capable of being measured and is present on the fibers for more than transitory duration. The electrical charge may be imparted to the fibers after formation, during laydown, or to one or more the individual layers of a respective nonwoven fabric during or prior to final formation of the respective nonwoven fabric to improve its filtering efficiency. For example, one or more of the respective nonwoven fabric may have meltblown fibers that comprise an electrical charge while the spunbond fibers (e.g., outer spunbond layers) may be not have received an electrical charge thereon. Alternatively, each layer of the respective nonwoven fabric may comprise an electrical charge thereon. For instance, the filtration media in accordance with certain embodiments of the invention may at least partially electrically charged. In accordance with certain embodiments of the invention, at least one or more layers of meltblown fibers are electrically charged. In accordance with certain embodiments of the invention, each of the plurality of nonwoven fabrics is electrically charged.

In accordance with certain embodiments of the invention, the filtration media comprises a plurality of nonwoven fabrics in which only the outermost nonwoven fabric (e.g., the nonwoven fabric that is or will be exposed to the external environment when worn as a facemask by a user) is electrically charged. For example, the filtration media may include (i) a first nonwoven fabric that is the outermost nonwoven fabric (e.g., positioned furthest away from a user when worn as a facemask) that is electrically charged, such as by corona charging; (ii) a second nonwoven fabric that is the innermost nonwoven fabric (e.g., positioned adjacent a user's skin when worn as a facemask) that may be electrically charged or uncharged; and (iii) a third nonwoven fabric that is located between the first nonwoven fabric and the second nonwoven fabric, in which the third nonwoven fabric may be electrically charged or uncharged. In accordance with certain embodiments of the invention, only the outermost nonwoven fabric (e.g., positioned furthest away from a user when worn as a facemask) is electrically charged while any other additional nonwoven fabrics of the filtration media may be devoid of electrical charge. For instance, all other nonwoven fabrics other than the outermost nonwoven fabric may not be electrically charged while the outermost nonwoven fabric is electrically charged.

In accordance with certain embodiments of the invention, any nonwoven fabrics of the filtration that have an electrical charge, such as by corona charging, may have one or more charge stabilizing additives. Charge stabilizing additive, for example, may include a hindered amine light stabilizer (HALS), such as a 'N—H'-HALS, a 'N-R'-HALS, a 'N-OR'-HALS, or any combination thereof, in which 'N' is a nitrogen atom, 'H' is a hydrogen atom, and 'R' comprises a saturated aliphatic radical, an unsaturated aliphatic radical, a saturated aromatic radical, or an unsaturated aromatic radical. In accordance with certain embodiments of the invention, the one or more charge stabilizing additives comprise a 'N-R'-HALS and/or a 'N-OR'-HALS and 'R' independently comprises from 1 to about 30 carbon atoms, such as from at least about any of the following: 1, 2, 3, 4, 5, 6, 8, 10, 15, 18, and 20 carbon atoms and/or from at most about any of the following: 30, 28, 26, 24, 22, and 20 carbon atoms. In accordance with certain embodiments of the invention, the HALS may be poly [[6-[1,1,3,3-tetramethylbutyl)amino]-s-triazine-2,4-diyl][(2,2,6,6-tetramethyl-4-piperidyl)imino]hexamethylene [(2,2,6,6-tetramemethyl-4-piperidinyl) imino]]. Additionally or alternatively, the charge stabilizing additive may comprise an organic amide derived from a carboxylic acid and an amine. There are numerous organic amide types commercially available. A wide variety of organic amides can be used in accordance with certain embodiments of the invention. Suitably, the organic amide compound may be derived from a carboxylic acid having 6-50, preferably 14-22, more preferably 16-29 carbon atoms, and an amine. In accordance with certain embodiments of the invention, organic bis-amides are used which are derived from organic diamines which are reacted with two carboxylic acids. The organic amides, for example, may be derived from aliphatic amines (e.g., diamines) and an aliphatic mono- or dicarboxylic acid. The aliphatic groups in the carboxylic acid group can be saturated or ethylenically unsaturated with one or more double bonds per molecule. Additionally or alternatively, the charge stabilizing additive may comprise a sterically hindered phenol. In accordance with certain embodiments of the invention, the sterically hindered phenol may comprise a benzotriazole UV light absorber and stabilizer, such as 2-(2H-Benzotriazol-2-yl)-4, 6-bis(1-methyl-1-phenylethyl) phenol. Additionally or alternatively, the charge stabilizing additive may comprise 1,3, 5-Tris(2,2-dimethylpropionylamino)benzene or its systematic name of propanamide, N,N' N'',N'''-1,3,5-benzenetriyltris(s,2-dimethyl-, which is commercially available from BASF as Irgaclear® XT 386.

In accordance with certain embodiments of the invention, the charge stabilizing agent may only be present in nonwoven fabrics of the filtration media that has been subjected to electrical charging, such as corona charging, hydrocharging, etc. For example, the outermost nonwoven fabric (e.g., positioned furthest away from a user when worn as a facemask) may be electrically charged and include one or more charge stabilizing agents, while each of the additional nonwoven fabrics of the filtration media may be devoid of an electrical charge and/or a charge stabilizing agent. In accordance with certain embodiments of the invention, the outermost nonwoven fabric (e.g., positioned furthest away from a user when worn as a facemask) of the filtration media may include one or more charge stabilizing agents from at least about 1 to about 10 wt. % of the nonwoven fabric, such as at least about any of the following: 1, 1.5, 2, 2.5, 3, 3.5, 4, 4.5, and 5 wt. % of the nonwoven fabric, and/or at most about any of the following: 10, 9, 8, 7, 6, and 5 wt. % of the nonwoven fabric.

Filtration media, in accordance of the invention, may comprises a first layer comprising an outermost nonwoven fabric (e.g., positioned furthest away from a user when worn as a facemask), an innermost nonwoven fabric (e.g., positioned adjacent a user's skin when worn as a facemask), and one or more interior or middle nonwoven fabrics located between the outermost nonwoven fabric and the innermost nonwoven fabric. In accordance with certain embodiments of the invention, only the outermost nonwoven layer has an electrical charge (e.g., provided by corona charging or the like) and charge stabilizing agent while the innermost nonwoven fabric and the one or more interior or middle nonwoven fabrics are devoid of both an electrical charge and a charge stabilizing agent. Filtration media having such a construction may beneficially provide an increase in resistance to penetration by polar liquids, such as water, alcohol, and blood. By way of example only, the filtration media may comprises an outermost nonwoven fabric of 32 gsm, an innermost nonwoven fabric of 20 gsm, and a single middle nonwoven layer of 20 gsm, in which only the outermost nonwoven fabric has been electrically charged (e.g., has an electric charge imparted thereon) and has a charge stabilizing agent.

In accordance with certain embodiments of the invention, the filtration media passes blood penetration testing according to ASTM F-1862 and ISO 22609, in which synthetic blood insulting the outermost nonwoven fabric does not pass through the filtration media. In accordance with certain embodiments of the invention, the filtration media having only the outermost nonwoven fabric electrically charged provides a better resistance to liquid penetration according to ASTM F-1862 and ISO 22609 as compared to an identical filtration media in which the outermost nonwoven fabric and one or more additional nonwoven fabrics of the filtration media are also electrically charged. Since electrically charging operations can make the resulting electrically charged nonwoven fabric more hydrophilic in nature, it is believed that electrical charging of nonwoven fabrics other than the outermost nonwoven fabric may provide a pulling effect from the charged outermost nonwoven fabric into and possibly through the filtration media.

In accordance with certain embodiments of the invention, the filtration media may comprises a variable porosity through the thickness of the nonwoven fabric. For example, the nonwoven may include a first outer surface having a first porosity, a second outer surface, and an interior region including a mid-point between the first outer surface and the second outer surface in the z-direction and having second porosity; wherein the first porosity is larger than the second porosity. In this regard, larger particulates and/or larger aerosolized components may be captured or blocked at or near the outermost surface, while the relatively smaller particulates and/or smaller aerosolized components may be captured or blocked within an interior region of the nonwoven. In accordance with certain embodiments of the invention, for instance, the nonwoven comprises a depth-filtration media without undesirably high pressure drops across the nonwoven. For example, the pressure drop or differential pressure across the nonwoven may comprise a value less than about 60 Pa/cm$^2$, such as less than 50 Pa/cm$^2$, or less than 40 Pa/cm$^2$.

In accordance with certain embodiments of the invention, the filtration media of has a Filtration Media Efficiency Factor (FMEF) of at least about 0.025, such as from at least about any of the following: 0.025, 0.03, 0.035, 0.04, 0.05, and 0.06 and/or at most about any of the following: 0.125, 0.1, 0.9, 0.08, 0.07, and 0.06;

wherein FMEF is determined according to Equation (1):

$$FMEF = (A/B)/C \qquad \text{Equation (1):}$$

wherein

A is the % filtration efficiency of the filtration media determined by TSI 8130 instrument at 85 LPM 2% NaCl solution. (particle size avg 0.3 micron);

B is the pressure drop across the filtration media in Pa/cm$^2$ according to EN14683/F2100-19; and C is the basis weight of the filtration media in gsm.

In accordance with certain embodiments of the invention, the filtration media has a Meltblown Filtration Efficiency Factor (MFEF) of at least about 0.1, such as from at least about any of the following: 0.1, 0.15, 0.2, 0.25, 0.3, 0.35, 0.4, and 0.5 and/or at most about any of the following: 0.75, 0.7, 0.65, 0.6, 0.55, and 0.5;

wherein MFEF is determined according to Equation (2):

$$FMFEF = (A/B)/D \qquad \text{Equation (2):}$$

wherein

A is the % filtration efficiency of the filtration media determined by TSI 8130 instrument at 85 LPM 2% NaCl solution. (particle size avg 0.3 micron);

B is the pressure drop across the filtration media in Pa/cm$^2$ according to EN14683/F2100-19; and D is the total basis weight of the meltblown layers in the filtration media in gsm.

In accordance with certain embodiments of the invention, the filtration media has a Bacterial Filtration Media Efficiency Factor (BFMEF) of at least about 0.03, such as from at least about any of the following: 0.03, 0.035, 0.04, 0.05, and 0.06 and/or at most about any of the following: 0.125, 0.1, 0.9, 0.08, 0.07, and 0.06;

wherein BFMEF is determined according to Equation (3):

$$BFMEF = (H/J)/K \qquad \text{Equation (3):}$$

wherein

H is the BFE % of the filtration media determined by ASTM F2101 or EN14683;

J is the pressure drop across the filtration media in Pa/cm$^2$ according to EN14683/F2100-19; and K is the basis weight of the filtration media in gsm.

In accordance with certain embodiments of the invention, the filtration media has a Meltblown Bacterial Filtration Efficiency Factor (MBFEF) of at least about 0.15, such as from at least about any of the following: 0.15, 0.2, 0.25, 0.3, 0.35, 0.4, 0.45, and 0.5 and/or at most about any of the following: 0.75, 0.7, 0.65, 0.6, 0.55, and 0.5;

wherein MBFEF is determined according to Equation (2):

$$MBFEF = (H/J)/M \qquad \text{Equation (2):}$$

wherein

H is the % BFE of the filtration media determined by ASTM F2101 or EN14683;

J is the pressure drop across the filtration media in Pa/cm$^2$ according to EN14683/F2100-19; and M is the total basis weight of the meltblown layers in the filtration media in gsm.

In another aspect, the present invention provides a method of making a filtration media, such as those described and disclosed herein. In accordance with certain embodiments of the invention, the method may comprise overlaying or stacking at least a first nonwoven fabric and a second nonwoven fabric in a face-to-face configuration in a z-direction to form a multi-layer fabric filtration media. The method may further comprise attaching the first nonwoven fabric and the second nonwoven fabric along at least a portion of a periphery of the multi-layer fabric filtration media. In accordance with certain embodiments of the invention, each of the first nonwoven fabric and the second nonwoven fabric have a structure according to the any one of the following:

$$S1_a\text{-}M1_b\text{-}S2_c; \text{ and} \qquad \text{(Structure 1)}$$

$$S1_a\text{-}M1_b\text{-}S3_d\text{-}M2_e\text{-}S2_c; \qquad \text{(Structure 2)}$$

wherein,

'M1' comprises a first meltblown layer or a first group of multiple meltblown layers;

'M2' comprises a second meltblown layer or a second group of multiple meltblown layers;

'S1' comprises a first spunbond layer or a first group of multiple spunbond layers;

'S2' comprises a second spunbond layer or a second group of multiple spunbond layers;

'S3' comprises a third spunbond layer or a third group of multiple spunbond layers;

'a' represents the number of layers of 'S1' and is independently selected from 1, 2, 3, 4, and 5;

'b' represents the number of layers of 'M1' and is independently selected from 1, 2, 3, 4, and 5;

'c' represents the number of layers of 'S2' and is independently selected from 1, 2, 3, 4, and 5;

'd' represents the number of layers of 'S3' and is independently selected from 1, 2, 3, 4, and 5; and 'e' represents the number of layers of 'M2' and is independently selected from 1, 2, 3, 4, and 5. In accordance with certain embodiments of the invention, the first nonwoven fabric includes at least one meltblown layer (M1) including a plurality of meltblown fibers having an average diameter from about 1 to about 5 microns, such as at least about any of the following: 1, 1.2, 1.4, 1.6, 1.8, 2, 2.2, 2.4, 2.6, 2.8, and 3 microns, and/or at most about any of the following: 5, 4.8, 4.5, 4.2, 4, 3.8, 3.5, 3.2, and 3 microns.

In accordance with certain embodiments of the invention, the method may further comprise imparting an electrical charge to at least a portion of the fibers forming at least one of the plurality of nonwoven fabrics. For example, the method may comprise imparting an electrical charge to one or more layers of meltblown fibers in one or more of the plurality of nonwoven fabrics (e.g., the first nonwoven fabric and/or the second nonwoven fabric). In accordance with certain embodiments of the invention, the method may comprise imparting the entirety of at least the first nonwoven fabric to an electrical charge, or the first and second nonwoven fabrics, or every nonwoven fabric forming the filtration media. For example, one or more (or each) of the nonwoven fabrics may individually be imparted with an electrical charge or the stacked multi-layer filtration media as a whole may be imparted with an electrical charge.

In accordance with certain embodiments of the invention, the operation or operations imparting an electrical charge may comprise one or more charge imparting mechanisms. For instance, charging may be accomplished via hydrocharging and/or electrostatic charging, such as via operation of a pinner bar or corona charging.

In accordance with certain embodiments of the invention, attaching the first nonwoven fabric and the second nonwoven fabric along at least a portion of a periphery of the multi-layer fabric filtration media may comprise forming one or more bond sites via a thermal bonding process, ultrasonic bonding process, stitching, clipping, clamping, adhesively bonding, or any combination thereof.

In yet another aspect, the present invention provides a facemask comprising a central body portion comprising a filtration media, such as those described and disclosed herein, and a periphery region surrounding the central body portion. The facemask may also include at least one strap attached directly or indirectly to the periphery region and/or the central body portion. In accordance with certain embodiments of the invention, the facemask may include a bendable reinforcement nose bar, which may be formed from a metal material. In accordance with certain embodiments of the invention, the at least one strap (e.g., two separate straps) comprises an elastic material. The periphery portion, for example, may comprise a moldable material that is different than the central body portion. For example, the moldable material may form an air-tight seal to an individual wearing the facemask.

Figure 5:
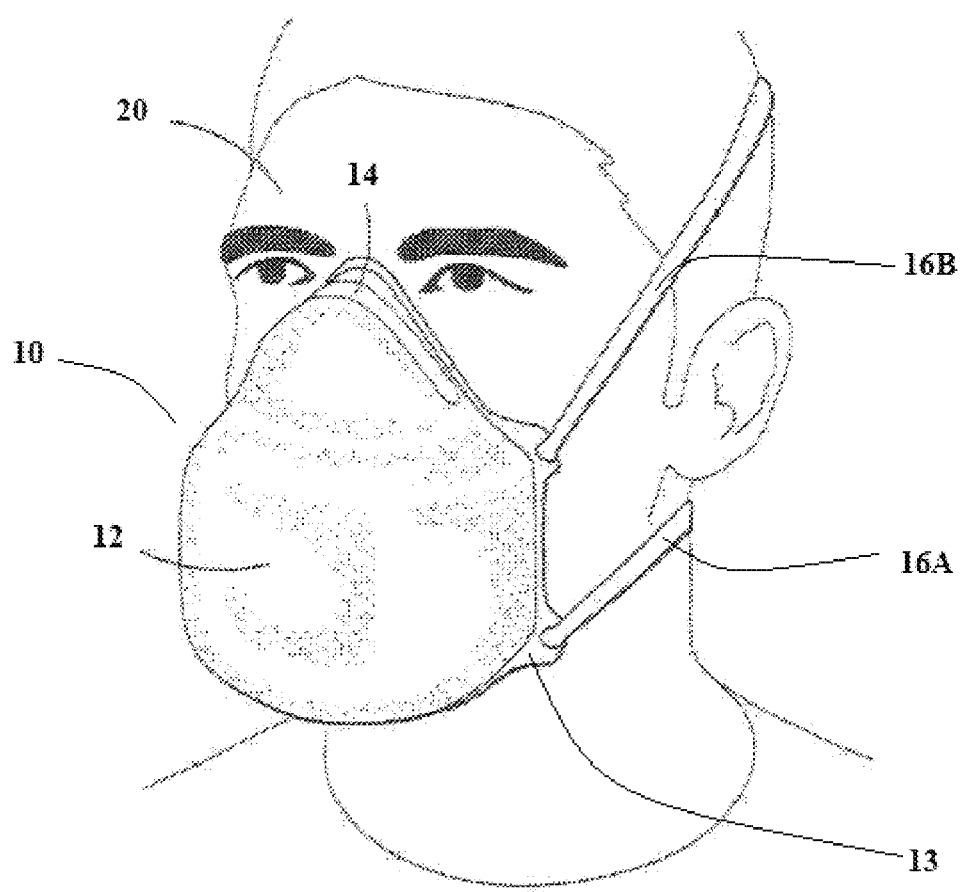
FIG. 5 illustrates a facemask in accordance with certain embodiments of the invention being worn by a user.

FIG. 5, for instance, illustrates a facemask 10 in accordance with certain embodiments of the invention being worn by a user 20. The facemask 10 includes a central body portion 12 formed from a filtration media as described and disclosed herein and a periphery region 13, which may be formed from the same of different material as the central body portion. As shown in FIG. 1, the facemask 10 also includes a bendable reinforcement nose bar 14 as well as two straps 16A,16B.

EXAMPLES

The present disclosure is further illustrated by the following examples, which in no way should be construed as being limiting. That is, the specific features described in the following examples are merely illustrative and not limiting.

Three different single layer base products (e.g., nonwoven fabrics) of differing basis weights were produced. In particular, a 11 gsm SSMMS (identified as NO5066 throughout), a 13 gsm SSMMS (identified as NO5065 throughout), and a 15 gsm SSMMS (identified as NO5067 throughout) were produced. Table 1 below provides a summary of the physical properties for each of these single layer base products (e.g., nonwoven fabrics).

TABLE 1

| Required Tide | Units | 11 GSM | 13 GSM | 15 GSM |
| --- | --- | --- | --- | --- |
| Basis weight | gsm | 11.4 | 13.2 | 14.8 |
| Resistance (Hydrohead) | Milibar | 21.8 | 18.4 | 21.0 |
| Tensile strength (CD peak) | N/cm | 2.17 | 2.83 | 3.33 |
| Elongation (CD peak) | % | 56.4 | 57.1 | 53.7 |
| Tensile strength (MD peak) | N/cm | 5.90 | 6.82 | 7.49 |
| Elongation (MD peak) | % | 50.1 | 54.3 | 54.4 |
| Air Permeablity (porosity) | m3/m2/min | 46.1 | 30.7 | 26.9 |
| Air Permeability | cfm | 151.1 | 100.6 | 88.1 |
| LSTST | s | 12.0 | 12.6 | 16.6 |
| Pore Size | micron | 12.7 | 8.6 | 8.2 |
| Total Throughput | kg/hr | 2356 | 2356 | 2356 |
| % MB Content | % | 15.9 | 15.9 | 15.9 |
| Construct | | SSMMS | SSMMS | SSMMS |
| Line Speed | mpm | 803 | 685 | 589 |
| Production Code | | NO5066 | NO5065 | NO5067 |

A first set of the single layer base products (e.g., nonwoven fabrics) were tested for TSI resistance at 85 LPM and TSI filtration efficiency at 85 LPM to provide a baseline for their individual performance. TSI 8130 at 85 LPM was used for all filtration analysis in all of the tables and data included in the Examples section of this disclosure. A second set of the single layer base products (e.g., nonwoven fabrics) were electrically charged via a corona treatment and tested for TSI resistance at 85 LPM and TSI filtration Efficiency at 85 LPM to provide a baseline for their individual performance when electrically charged. As shown in Table 2, the electrically charged single layer base products realized an improvement in TSI filtration efficiency.

TABLE 2

| Required Title | Test Method | Units | 11GSM | 13GSM | 15GSM |
| --- | --- | --- | --- | --- | --- |
| Layer | | | 1 Layer | 1 Layer | 1 Layer |
| Basis weight | | gsm | 11.4 | 13.2 | 14.8 |
| Tensile strength (CD peak) | WSP 110.4 (OS) | N/cm | 2.17 | 2.83 | 3.33 |
| Elongation (CD peak) | WSP 110.4 (OS) | % | 56.4 | 57.1 | 53.7 |
| Tensile strength (MD peak) | WSP 110.4 (OS) | N/cm | 5.90 | 6.82 | 7.49 |
| Elongation (MD peak) | WSP 110.4 (OS) | % | 50.1 | 54.3 | 54.4 |
| Air Permeability (porosity) | | m3/m2/min | 46.1 | 30.7 | 26.9 |
| Air Permeability | | cfm | 151.1 | 100.6 | 88.1 |
| differential Pressure unTreated Product | EN 14683 | mmH$_2$O/cm$^2$ | 0.80 | 1.23 | 1.65 |
| TSI Resistance @ 85 LPM | TSI 8130 2% NaCl Solution | mmH$_2$O | 3.45 | 4.68 | 5.95 |

TABLE 2-continued

| Required Title | Test Method | Units | 11GSM | 13GSM | 15GSM |
|---|---|---|---|---|---|
| TSI Filtration Efficiency @ 85 LPM Treated Product | TSI 8130 2% NaCl Solution Corona Treatment | % | 11.6 | 19.4 | 22.4 |
| TSI Resistance @ 85 LPM | TSI 8130 2% NaCl Solution | mmH$_2$O | 3.52 | 4.75 | 5.98 |
| TSI Filtration Efficiency @ 85 LPM | TSI 8130 2% NaCl Solution | % | 27.2 | 34.5 | 40.0 |
| Production Code | | | NO5066 | NO5065 | NO5067 |

Next, the three different single layer base products (e.g., nonwoven fabrics) were stacked in a variety of multi-fabric configurations and tested to evaluate the pressure drop across the multi-fabric configurations, air permeability, and filtration efficiency. Each of the single layer base products were electrically charged. Table 3 illustrates the various combinations of the single layer base products used to form the final multi-fabric configurations that were tested.

TABLE 3

| Layer 1 | Layer 2 | Layer 3 | Layer 4 | Layer 5 | BW [gsm] | dP (PA/cm2) | Air Perm [cfm] | Resistance [mm H2O] | Penetration [%] | Filt. Efficiency [%] |
|---|---|---|---|---|---|---|---|---|---|---|
| NO5066 | | | | | 11.35 | 8.33 | 157.33 | 3.52 | 72.85 | 27.15 |
| NO5065 | | | | | 13.17 | 11.70 | 114.33 | 4.75 | 65.47 | 34.53 |
| NO5067 | | | | | 14.82 | 16.05 | 83.45 | 5.98 | 60.02 | 39.98 |
| NO5066 | NO5066 | | | | 22.71 | 18.64 | 74.10 | 6.32 | 53.73 | 46.27 |
| NO5065 | NO5065 | | | | 26.34 | 24.08 | 55.83 | 8.68 | 44.18 | 55.82 |
| NO5067 | NO5067 | | | | 29.65 | 33.50 | 46.87 | 11.27 | 37.47 | 62.53 |
| NO5066 | NO5066 | NO5066 | | | 34.06 | 27.35 | 48.10 | 9.13 | 39.65 | 60.35 |
| NO5067 | NO5065 | NO5066 | | | 39.35 | 39.39 | 35.07 | 12.23 | 29.67 | 70.33 |
| NO5065 | NO5065 | NO5065 | | | 39.51 | 36.33 | 36.68 | 12.40 | 29.92 | 70.08 |
| NO5065 | NO5067 | NO5065 | | | 41.16 | 43.06 | 32.03 | 13.50 | 27.60 | 72.40 |
| NO5067 | NO5067 | NO5067 | | | 44.47 | 51.39 | 27.17 | 15.70 | 23.05 | 76.95 |
| NO5066 | NO5066 | NO5066 | NO5066 | | 45.41 | 37.18 | 36.05 | 11.83 | 28.93 | 71.07 |
| NO5065 | NO5066 | NO5066 | NO5065 | | 49.05 | 46.94 | 29.20 | 14.40 | 23.60 | 76.40 |
| NO5065 | NO5066 | NO5066 | NO5067 | | 50.70 | 49.80 | 27.40 | 15.58 | 21.53 | 78.47 |
| NO5065 | NO5067 | NO5066 | NO5066 | | 50.70 | 49.12 | 27.93 | 15.13 | 21.97 | 78.03 |
| NO5065 | NO5065 | NO5066 | NO5065 | | 50.86 | 50.07 | 27.63 | 15.47 | 21.47 | 78.53 |
| NO5065 | NO5067 | NO5066 | NO5065 | | 52.52 | 53.06 | 26.20 | 16.17 | 20.17 | 79.83 |
| NO5065 | NO5065 | NO5065 | NO5065 | | 52.68 | 52.07 | 27.32 | 15.97 | 20.58 | 79.42 |
| NO5066 | NO5065 | NO5066 | NO5066 | NO5066 | 56.77 | 46.97 | 28.93 | 14.38 | 21.72 | 78.28 |
| NO5067 | NO5067 | NO5067 | NO5067 | | 59.29 | 64.90 | 20.22 | 20.90 | 14.68 | 85.32 |
| NO5065 | NO5065 | NO5065 | NO5065 | NO5065 | 65.85 | 62.89 | 21.82 | 19.47 | 14.43 | 85.57 |
| NO5067 | NO5067 | NO5067 | NO5067 | NO5067 | 74.12 | 84.97 | 16.32 | 25.60 | 9.50 | 90.50 |

For comparison, non-charged versions of the multi-fabric configurations shown in Table 3 were produced and tested. Table 4 illustrates the various combinations of the non-charged single layer base products used to form the final multi-fabric configurations that were tested.

TABLE 4

| Layer 1 | Layer 2 | Layer 3 | Layer 4 | Layer 5 | BW [gsm] | dP (PA/cm2) | Air Perm [cfm] | Resistance [mm H2O] | Penetration [%] | Filt. Efficiency [%] |
|---|---|---|---|---|---|---|---|---|---|---|
| NO5066 | | | | | 11.35 | 7.86 | 148.67 | 3.45 | 88.43 | 11.57 |
| NO5065 | | | | | 13.17 | 12.11 | 111.17 | 4.68 | 80.62 | 19.38 |
| NO5067 | | | | | 14.82 | 16.16 | 81.33 | 5.95 | 77.65 | 22.35 |
| NO5066 | NO5066 | | | | 22.71 | 17.89 | 73.83 | 6.12 | 78.85 | 21.15 |
| NO5065 | NO5065 | | | | 26.34 | 24.12 | 54.87 | 8.62 | 65.85 | 34.15 |
| NO5067 | NO5067 | | | | 29.65 | 33.37 | 40.32 | 11.02 | 61.85 | 38.15 |
| NO5066 | NO5066 | NO5066 | | | 34.06 | 26.39 | 48.97 | 8.72 | 70.02 | 29.98 |
| NO5067 | NO5065 | NO5066 | | | 39.35 | 40.27 | 33.33 | 12.50 | 57.00 | 43.00 |
| NO5065 | NO5065 | NO5065 | | | 39.51 | 36.63 | 36.28 | 12.22 | 55.32 | 44.68 |
| NO5065 | NO5067 | NO5065 | | | 41.16 | 42.38 | 31.80 | 13.30 | 52.50 | 47.50 |
| NO5067 | NO5067 | NO5067 | | | 44.47 | 51.36 | 26.77 | 16.03 | 49.43 | 50.57 |
| NO5066 | NO5066 | NO5066 | NO5066 | | 45.41 | 36.05 | 36.82 | 11.23 | 62.72 | 37.28 |
| NO5065 | NO5066 | NO5066 | NO5065 | | 49.05 | 46.26 | 29.40 | 14.30 | 51.50 | 48.50 |
| NO5065 | NO5066 | NO5066 | NO5067 | | 50.70 | 48.10 | 27.67 | 14.87 | 49.43 | 50.57 |
| NO5065 | NO5067 | NO5066 | NO5066 | | 50.70 | 48.16 | 28.17 | 14.57 | 52.63 | 47.37 |
| NO5065 | NO5065 | NO5066 | NO5065 | | 50.86 | 46.94 | 27.13 | 15.10 | 48.57 | 51.43 |

TABLE 4-continued

| Layer 1 | Layer 2 | Layer 3 | Layer 4 | Layer 5 | BW [gsm] | dP (PA/cm2) | Air Perm [cfm] | Resistance [mm H2O] | Penetration [%] | Filt. Efficiency [%] |
|---|---|---|---|---|---|---|---|---|---|---|
| NO5065 | NO5067 | NO5066 | NO5065 | | 52.52 | 52.11 | 25.53 | 15.93 | 47.47 | 52.53 |
| NO5065 | NO5065 | NO5065 | NO5065 | | 52.68 | 49.39 | 26.97 | 15.72 | 47.17 | 52.83 |
| NO5066 | NO5065 | NO5066 | NO5066 | NO5066 | 56.77 | 46.80 | 29.43 | 13.85 | 56.07 | 43.93 |
| NO5067 | NO5067 | NO5067 | NO5067 | | 59.29 | 67.24 | 20.17 | 20.72 | 40.68 | 59.32 |
| NO5065 | NO5065 | NO5065 | NO5065 | NO5065 | 65.85 | 63.10 | 21.88 | 19.12 | 40.55 | 59.45 |
| NO5067 | NO5067 | NO5067 | NO5067 | NO5067 | 74.12 | 84.66 | 16.15 | 25.32 | 33.55 | 66.45 |

Figure 6:
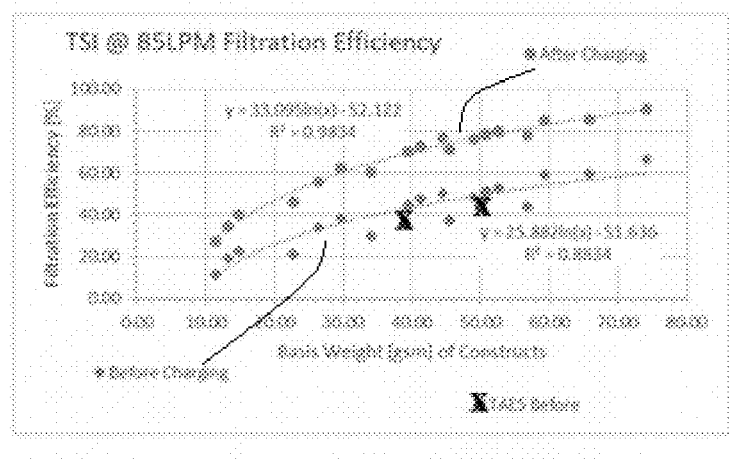
FIG. 6 is a plot of filtration efficiency vs. basis weight.
Figure 7:
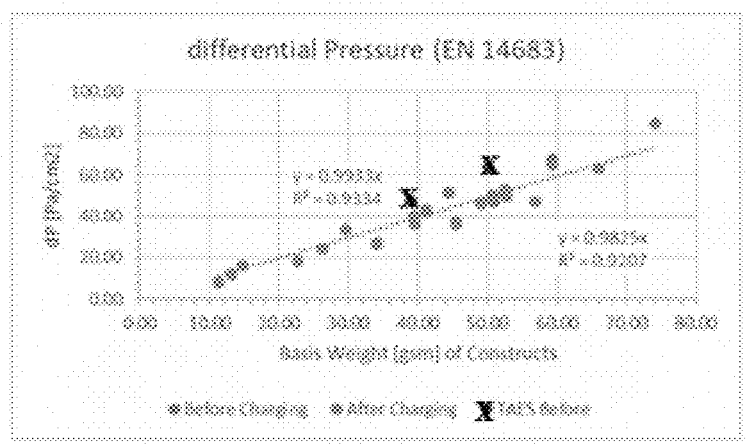
FIG. 7 is a plot of differential pressure vs basis weight.

Comparison between the charged and non-charged multi-fabric configurations with respect to differential pressure and filtration efficiency shows that the filtration efficiency is improved due to electrical charging and the differential pressure is not significantly impacted (if at all) by the use of electrically charged nonwoven fabric layers. FIG. 6 illustrates the filtration efficiency vs. basis weight for the charged multi-fabric configurations and the non-charged multi-fabric configurations. FIG. 7 shows the pressure drop vs. basis weight for the charged multi-fabric configurations and the non-charged multi-fabric configurations. FIGS. 6 and 7 also show test results for two higher basis weight single fabric filtration media (identified as TEAS) (i.e., a 39 gsm and a 50 gsm single fabric filtration media). That data plotted in FIGS. 6 and 7 illustrate that the single layer heavier basis weight filtration media may provide similar filtration efficiency at 85 LPM, but the differential pressure realized by the single layer heavier basis weight filtration media is undesirably above 40 Pa/cm². In this regard, multi-fabric filtration media in accordance with certain embodiments of the invention can provide similar or improved filtration efficiency while providing a reduced differential pressure for an identical or lower basis weight.

In addition to the foregoing tests, several additional multi-fabric configurations were constructed and analyzed for a variety of properties, including TSI resistance at 85 LPM and 32 LPM as well as TSI filtration Efficiency at 85 LPM and 32 LPM. Each of the multi-fabric constructs were tested in an electrically uncharged state. Table 5, for instance, illustrates five (5) different constructs formed only from one or more layers of the 11 gsm SSMMS (identified as NO5066 throughout) fabric described above. Table 6, for instance, illustrates five (5) different constructs formed only from one or more layers of the 13 gsm SSMMS (identified as NO5065 throughout) fabric described above. Table 7, for instance, illustrates five (5) different constructs formed only from one or more layers of the 15 gsm SSMMS (identified as NO5067 throughout) fabric described above.

TABLE 5

| | | BW [gsm] | dP (PA/cm2) | AP (cfm) | HH [mbar] | SI [g] | MFPD | BP | TSI 85 LPM | | | |
|---|---|---|---|---|---|---|---|---|---|---|---|---|
| | | | | | | | | | Resistance [mm H2O] | Resistance [Pa] | Penetration [%] | Filt. Efficiency [%] |
| 1 LAYER OF NO5066 | 1 | 11.4 | 7.9 | 148.7 | 23.2 | 16.81 | 16.3 | 91.5 | 3.5 | 33.8 | 88.4 | 11.6 |
| 2 LAYERS OF NO5066 | 2 | 22.7 | 17.9 | 73.8 | 30.7 | 0.09 | 16.2 | 50.4 | 6.1 | 60.0 | 78.9 | 21.2 |
| 3 LAYERS OF NO5066 | 3 | 34.1 | 26.4 | 49.0 | 34.8 | 0.05 | 13.3 | 36.5 | 8.7 | 85.5 | 70.0 | 30.0 |
| 4 LAYERS OF NO5066 | 4 | 45.4 | 36.1 | 36.8 | 36.7 | 0.05 | 12.1 | 63.5 | 11.2 | 110.2 | 62.7 | 37.3 |
| 5 LAYERS OF NO5066 | 5 | 56.8 | 46.8 | 29.4 | 38.9 | 0.04 | 10.8 | 49.3 | 13.9 | 135.8 | 56.1 | 43.9 |

| | TSI 32 LPM | | | |
|---|---|---|---|---|
| | Resistance [mm H2O] | Resistance [Pa] | Penetration [%] | Filt. Efficiency [%] |
| 1 LAYER OF NO5066 | 1.0 | 9.8 | 83.9 | 16.1 |
| 2 LAYERS OF NO5066 | 2.0 | 19.1 | 72.7 | 27.3 |
| 3 LAYERS OF NO5066 | 3.0 | 29.3 | 62.7 | 37.3 |
| 4 LAYERS OF NO5066 | 4.0 | 38.7 | 53.8 | 46.2 |
| 5 LAYERS OF NO5066 | 4.9 | 48.2 | 46.6 | 53.4 |

TABLE 6

| | | BW [gsm] | dP (PA/cm2) | AP (cfm) | HH [mbar] | SI [g] | MFPD | BP | TSI 85 LPM | | | |
|---|---|---|---|---|---|---|---|---|---|---|---|---|
| | | | | | | | | | Resistance [mm H2O] | Resistance [Pa] | Penetration [%] | Filt. Efficiency [%] |
| 1 LAYER OF NO5065 | 1 | 13.2 | 12.1 | 111.2 | 21.0 | 10.96 | 12.6 | 63.5 | 4.7 | 45.9 | 80.6 | 19.4 |
| 2 LAYERS OF NO5065 | 2 | 26.3 | 24.1 | 54.9 | 30.0 | 0.08 | 12.2 | 50.7 | 8.6 | 84.5 | 65.9 | 34.2 |
| 3 LAYERS OF NO5065 | 3 | 39.5 | 36.6 | 36.3 | 34.4 | 0.06 | 10.9 | 46.1 | 12.2 | 119.8 | 55.3 | 44.7 |
| 4 LAYERS OF NO5065 | 4 | 52.7 | 49.4 | 27.0 | 38.2 | 0.04 | 9.6 | 38.8 | 15.7 | 154.1 | 47.2 | 52.8 |
| 5 LAYERS OF NO5065 | 5 | 65.9 | 63.1 | 21.9 | 39.4 | 0.06 | 9.1 | 40.8 | 19.1 | 187.5 | 40.6 | 59.5 |

| | TSI 32 LPM | | | |
|---|---|---|---|---|
| | Resistance [mm H2O] | Resistance [Pa] | Penetration [%] | Filt. Efficiency [%] |
| 1 LAYER OF NO5065 | 1.4 | 13.6 | 77.2 | 22.8 |
| 2 LAYERS OF NO5065 | 2.8 | 27.8 | 61.2 | 38.8 |
| 3 LAYERS OF NO5065 | 4.3 | 42.5 | 49.1 | 50.9 |
| 4 LAYERS OF NO5065 | 5.7 | 55.9 | 39.1 | 60.9 |
| 5 LAYERS OF NO5065 | 7.0 | 69.0 | 31.4 | 68.7 |

TABLE 7

| | | BW [gsm] | dP (PA/cm2) | AP (cfm) | HH [mbar] | SI [g] | MFPD | BP | TSI 85 LPM | | | | TSI 32 LPM | | | |
|---|---|---|---|---|---|---|---|---|---|---|---|---|---|---|---|---|
| | | | | | | | | | Resistance [mm H2O] | Resistance [Pa] | Penetration [%] | Filt. Efficiency [%] | Resistance [mm H2O] | Resistance [Pa] | Penetration [%] | Filt. Efficiency [%] |
| 1 LAYER OF NO5067 | 1 | 14.8 | 16.2 | 81.3 | 29.0 | 0.44 | 12.0 | 43.2 | 6.0 | 58.3 | 77.7 | 22.4 | 1.9 | 18.1 | 75.9 | 24.1 |
| 2 LAYERS OF NO5067 | 2 | 29.6 | 33.4 | 40.3 | 38.6 | 0.05 | 9.9 | 36.6 | 11.0 | 108.0 | 61.9 | 38.2 | 3.7 | 35.8 | 58.5 | 41.5 |
| 3 LAYERS OF NO5067 | 3 | 44.5 | 51.4 | 26.8 | 44.2 | 0.04 | 8.6 | 37.0 | 16.0 | 157.2 | 49.4 | 50.6 | 5.4 | 52.6 | 44.5 | 55.5 |
| 4 LAYERS OF NO5067 | 4 | 59.3 | 67.2 | 20.2 | 37.1 | 0.04 | 3.5 | 38.4 | 20.7 | 203.2 | 40.7 | 59.3 | 7.2 | 70.6 | 34.2 | 65.8 |
| 5 LAYERS OF NO5067 | 5 | 74.1 | 84.7 | 16.2 | 52.0 | 0.04 | 6.9 | 82.9 | 25.3 | 248.3 | 33.6 | 66.5 | 9.0 | 88.4 | 26.1 | 74.0 |

A synthetic blood penetration resistance analysis was performed for a first multi-fabric filtration media consisting of a stack of four (4) layers of the 13 gsm (NO5065) noted above, in which none of the layers of the first multi-fabric filtration media were electrically charged. A second multi-fabric filtration media consisting of a stack of three (3) layers of the 15 gsm (NO5067), in which none of the layers of the second multi-fabric filtration media were electrically charged. The test procedure utilized for analysis of synthetic blood penetration resistance was Standard Test Protocol (STP) Number: STP0012 Rev. 09. In particular, the procedure was performed to evaluate the multi-fabric filtration media, which may be suitable for use as a surgical facemask and other types of protective clothing materials designed to protect against fluid penetration. The procedure simulates an arterial spray and evaluates the effectiveness of the test article (i.e., the first and second multi-fabric filtration media) in protecting a user from possible exposure to blood and/or other body fluids. The distance from the target area surface to the tip of the cannula is 30.5 cm. A test volume of 2 mL of synthetic blood was employed using the targeting plate method. This test method was designed to comply with ASTM F-1862 and ISO 22609 (as referenced in EN 14683: 2019 and AS4381: 2015) with the following exception: ISO 22609 requires testing to be performed in an environment with a temperature of 21±5° C. and a relative humidity of 85±10%. Instead, testing was performed at ambient conditions within one minute of removal from the environmental chamber held at those parameters.

Thirty-two (32) separate samples of the first multi-fabric filtration media were tested for synthetic blood penetration resistance in the manner outlined above, in which an outside of surface of the first multi-fabric filtration media was insulted with the synthetic blood. Thirty (30) of the thirty-two (32) samples passed as the synthetic blood was not visible on the opposite side of the first multi-fabric filtration media. These samples were pre-conditioned for 4 hours at 21±5° C. and 85±5% relative humidity (RH), which the test conditions were 23.5° C. and 21% RH at a pressure of 160 mm Hg. Per ASTM F-1862 and ISO 22609, an acceptable quality limit of 4.0% is met for a normal single sampling plan when ≥29 of 32 test articles show passing results.

Thirty-two (32) separate samples of the second multi-fabric filtration media were tested for synthetic blood penetration resistance in the manner outlined above, in which an outside of surface of the second multi-fabric filtration media was insulted with the synthetic blood. Al thirty-two (32) samples passed as the synthetic blood was not visible on the opposite side of the second multi-fabric filtration media. These samples were pre-conditioned for 4 hours at 21±5° C. and 85±5% relative humidity (RH), which the test conditions were 23.5° C. and 21% RH at a pressure of 160 mm Hg. Per ASTM F-1862 and ISO 22609, an acceptable quality limit of 4.0% is met for a normal single sampling plan when ≥29 of 32 test articles show passing results.

In this regard, the synthetic blood penetration resistance analysis confirms that uncharged multi-fabric filtration media pass Level 3 blood barrier testing at the Level 3 pressure of 160 mm Hg.

An additional multi-fabric filtration media (i.e., a third multi-fabric filtration media) was made, and included an outermost nonwoven fabric of 32 gsm, an innermost nonwoven fabric of 20 gsm, and a single middle nonwoven layer of 20 gsm. Only the outermost nonwoven fabric was electrically charged (e.g., has an electric charge imparted thereon) via a corona charging operation. A charge stabilizing agent at a weight percentage of 2.9 wt. % of the outermost nonwoven fabric was included in the outermost nonwoven fabric. The charge stabilizing agent consisted of 1,3,5-Tris(2,2-dimethylpropionylamino)benzene or its systematic name of propanamide, N,N' N'',N'''-1,3,5-benzenetriyltris(s,2-dimethyl-, which is commercially available from BASF as Irgaclear® XT 386.

Thirty-two (32) separate samples of the third multi-fabric filtration media were tested for synthetic blood penetration resistance in the manner outlined above, in which an outside of surface of the 32 gsm nonwoven fabric of the third multi-fabric filtration media was insulted with the synthetic blood. Al thirty-two (32) samples passed as the synthetic blood was not visible on the opposite side of the third multi-fabric filtration media. These samples were pre-conditioned for 4 hours at 21±5° C. and 85±5% relative humidity (RH), which the test conditions were 23.5° C. and 21% RH at a pressure of 160 mm Hg. Per ASTM F-1862 and ISO 22609, an acceptable quality limit of 4.0% is met for a normal single sampling plan when ≥29 of 32 test articles show passing results.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A filtration media, comprising:
   a plurality of nonwoven fabrics including at least a first nonwoven fabric and a second nonwoven fabric each having a structure according to the any one of the following:

$$S1_a\text{-}M1_b\text{-}S2_c; \text{ and} \qquad \text{(Structure 1)}$$

$$S1_a\text{-}M1_b\text{-}S3_d\text{-}M2_e\text{-}S2_c; \qquad \text{(Structure 2)}$$

wherein,
   'M1' comprises a first meltblown layer or a first group of multiple meltblown layers;
   'M2' comprises a second meltblown layer or a second group of multiple meltblown layers;
   'S1' comprises a first spunbond layer or a first group of multiple spunbond layers;
   'S2' comprises a second spunbond layer or a second group of multiple spunbond layers;
   'S3' comprises a third spunbond layer or a third group of multiple spunbond layers;
   'a' represents the number of layers of 'S1' and is independently selected from 1, 2, 3, 4, and 5;
   'b' represents the number of layers of 'M1' and is independently selected from 1, 2, 3, 4, and 5;
   'c' represents the number of layers of 'S2' and is independently selected from 1, 2, 3, 4, and 5;
   'd' represents the number of layers of 'S3' and is independently selected from 1, 2, 3, 4, and 5;
   and
   'e' represents the number of layers of 'M2' and is independently selected from 1, 2, 3, 4, and 5;
   wherein the first nonwoven fabric and the second nonwoven fabric each includes at least one meltblown layer (M1) including a plurality of meltblown fibers comprising a polyolefin, and wherein the plurality of meltblown fibers have an average diameter from about 1 to about 5 microns;
   wherein the filtration media has a Filtration Media Efficiency Factor (FMEF) of at least about 0.025;
   wherein FMEF is determined according to Equation (1):

$$FMEF=(A/B)/C \qquad \text{Equation (1):}$$

wherein
   A is the % filtration efficiency of the filtration media determined by TSI 8130 instrument at 85 LPM 2% NaCl solution, (particle size avg 0.3 micron);
   B is the pressure drop across the filtration media in $Pa/cm^2$ according to EN14683/F2100-19; and
   C is the basis weight of the filtration media in gsm.

2. The filtration media of claim 1, further comprising a third nonwoven fabric having a structure according to Structure 1 or Structure 2.

3. The filtration media of claim 2, wherein the first nonwoven fabric, the second nonwoven fabric, and the third nonwoven fabric each independently has a basis weight from about 5 to about 50 gsm.

4. The filtration media of claim 1, wherein the plurality of nonwoven fabrics are stacked upon each other in a face-to-face orientation in a z-direction and provide a multi-fabric filtration media.

5. The filtration media of claim 4, wherein the plurality of nonwoven fabrics are bonded to each other along a periphery of the multi-fabric filtration media.

6. The filtration media of claim 5, wherein the plurality of nonwoven fabrics are stitch bonded, thermally bonded, ultrasonically bonded, or adhesively bonded to each other along a periphery of the multi-fabric filtration media.

7. The filtration media of claim 5, wherein the multi-fabric filtration media is devoid of any additional bond sites other than those associated along the periphery of the multi-fabric filtration media.

8. The filtration media of claim 1, wherein each of the plurality of nonwoven fabrics comprise from about 5% by weight to about 25% by weight of the plurality of meltblown fibers.

9. The filtration media of claim 1, wherein each of the plurality of nonwoven fabrics comprise from about 1 to about 5 gsm of the plurality of meltblown fibers.

10. The filtration media of claim 1, wherein each of the plurality of nonwoven fabrics comprise the same basis weight.

11. The filtration media of claim 1, wherein the first nonwoven fabric has a first basis weight and the second nonwoven fabric has a second basis weight; wherein the first basis weight is different than the second basis weight.

12. The filtration media of claim 1, wherein the filtration media has one or more of the following: a pressure drop of at most 60 Pa/cm$^2$; a Bacterial Filtration Efficiency (BFE) of at least 95%; an air permeability from about 20 to about 85 cfm when the pressure differential is set at 125 Pa; and passes blood penetration testing according to ASTM F-1862 and ISO 22609.

13. The filtration media of claim 1, wherein the filtration media is at least partially electrically charged.

14. The filtration media of claim 1, wherein the filtration media has a Meltblown Filtration Efficiency Factor (MFEF) of at least about 0.1;
wherein MFEF is determined according to Equation (2):

$$FMFEF=(A/B)/D \qquad \text{Equation (2):}$$

wherein
A is the % filtration efficiency of the filtration media determined by TSI 8130 instrument at 85 LPM 2% NaCl solution, (particle size avg 0.3 micron);
B is the pressure drop across the filtration media in Pa/cm$^2$ according to EN14683/F2100-19; and
D is the total basis weight of the meltblown layers in the filtration media in gsm.

15. The filtration media of claim 1,
wherein the first nonwoven fabric and a second nonwoven fabric are bonded to each other along a periphery of the multi-fabric filtration media, and wherein the first nonwoven fabric and the second nonwoven fabric whereby respective central body portions of the first nonwoven fabric and the second nonwoven fabric are not bonded to each other, wherein the central body portions of the first nonwoven fabric and the second nonwoven fabric comprise from 25% to 95% of respective innermost surface areas of the first nonwoven fabric and the second nonwoven fabric.

16. The filtration media of claim 15, further comprising a gap between the respective central body portions of the first nonwoven fabric and the second nonwoven fabric.

17. The filtration media of claim 1, wherein the FMEF of the filtration media is from 0.025 to 0.125.

18. A filtration media, comprising:
a plurality of nonwoven fabrics including at least a first nonwoven fabric and a second nonwoven fabric each having a structure according to the any one of the following:

$$S1_a\text{-}M1_b\text{-}S2_c; \text{ and} \qquad \text{(Structure 1)}$$

$$S1_a\text{-}M1_b\text{-}S3_d\text{-}M2_e\text{-}S2_c; \qquad \text{(Structure 2)}$$

wherein,
'M1' comprises a first meltblown layer or a first group of multiple meltblown layers;
'M2' comprises a second meltblown layer or a second group of multiple meltblown layers;
'S1' comprises a first spunbond layer or a first group of multiple spunbond layers;
'S2' comprises a second spunbond layer or a second group of multiple spunbond layers;
'S3' comprises a third spunbond layer or a third group of multiple spunbond layers;
'a' represents the number of layers of 'S1' and is independently selected from 1, 2, 3, 4, and 5;
'b' represents the number of layers of 'M1' and is independently selected from 1, 2, 3, 4, and 5;
'c' represents the number of layers of 'S2' and is independently selected from 1, 2, 3, 4, and 5;
'd' represents the number of layers of 'S3' and is independently selected from 1, 2, 3, 4, and 5; and
'e' represents the number of layers of 'M2' and is independently selected from 1, 2, 3, 4, and 5;
wherein the first nonwoven fabric and the second nonwoven fabric each includes at least one meltblown layer (M1) including a plurality of meltblown fibers comprising a polyolefin, and wherein the plurality of meltblown fibers have an average diameter from about 1 to about 5 microns;
wherein the filtration media has a Meltblown Filtration Efficiency Factor (MFEF) of at least about 0.1;
wherein MFEF is determined according to Equation (2):

$$FMFEF=(A/B)/D \qquad \text{Equation (2):}$$

wherein
A is the % filtration efficiency of the filtration media determined by TSI 8130 instrument at 85 LPM 2% NaCl solution, (particle size avg 0.3 micron);
B is the pressure drop across the filtration media in Pa/cm$^2$ according to EN14683/F2100-19; and
D is the total basis weight of the meltblown layers in the filtration media in gsm.

19. The filtration media of claim 18, further comprising a third nonwoven fabric having a structure according to Structure 1 or Structure 2.

20. The filtration media of claim 19, wherein the first nonwoven fabric, the second nonwoven fabric, and the third nonwoven fabric each independently has a basis weight from about 5 to about 50 gsm.

21. The filtration media of claim 18, wherein the plurality of nonwoven fabrics are stacked upon each other in a face-to-face orientation in a z-direction and provide a multi-fabric filtration media.

22. The filtration media of claim 21, wherein the plurality of nonwoven fabrics are bonded to each other along a periphery of the multi-fabric filtration media.

23. The filtration media of claim 22, wherein the plurality of nonwoven fabrics are stitch bonded, thermally bonded, ultrasonically bonded, or adhesively bonded to each other along a periphery of the multi-fabric filtration media.

24. The filtration media of claim 22, wherein the multi-fabric filtration media is devoid of any additional bond sites other than those associated along the periphery of the multi-fabric filtration media.

25. The filtration media of claim 18, wherein each of the plurality of nonwoven fabrics comprise from about 5% by weight to about 25% by weight of the plurality of meltblown fibers.

26. The filtration media of claim 18, wherein each of the plurality of nonwoven fabrics comprise from about 1 to about 5 gsm of the plurality of meltblown fibers.

27. The filtration media of claim 18, wherein each of the plurality of nonwoven fabrics comprise the same basis weight.

28. The filtration media of claim 18, wherein the first nonwoven fabric has a first basis weight and the second nonwoven fabric has a second basis weight; wherein the first basis weight is different than the second basis weight.

29. The filtration media of claim 18, wherein the filtration media has one or more of the following: a pressure drop of at most 60 Pa/cm$^2$; a Bacterial Filtration Efficiency (BFE) of at least 95%; an air permeability from about 20 to about 85 cfm when the pressure differential is set at 125 Pa; and passes blood penetration testing according to ASTM F-1862 and ISO 22609.

30. The filtration media of claim 18, wherein the filtration media is at least partially electrically charged.

31. The filtration media of claim 18, wherein the first nonwoven fabric and a second nonwoven fabric are bonded to each other along a periphery of the multi-fabric filtration media, and wherein the first nonwoven fabric and the second nonwoven fabric whereby respective central body portions of the first nonwoven fabric and the second nonwoven fabric are not bonded to each other, wherein the central body portions of the first nonwoven fabric and the second nonwoven fabric comprise from 25% to 95% of respective innermost surface areas of the first nonwoven fabric and the second nonwoven fabric.

32. The filtration media of claim 31, further comprising a gap between the respective central body portions of the first nonwoven fabric and the second nonwoven fabric.

* * * * *

UNITED STATES PATENT AND TRADEMARK OFFICE
CERTIFICATE OF CORRECTION

| | | |
|---|---|---|
| PATENT NO. | : 12,303,814 B2 | Page 1 of 1 |
| APPLICATION NO. | : 17/319336 | |
| DATED | : May 20, 2025 | |
| INVENTOR(S) | : Ralph A. Moody, III et al. | |

It is certified that error appears in the above-identified patent and that said Letters Patent is hereby corrected as shown below:

In the Specification

In Column 7, Line 9, "$S1_a$-$M1_b$-$S3_a$-$M2_e$-$S2_c$;" should read --$S1_a$-$M1_b$-$S3_d$-$M2_e$-$S2_c$;--

In the Claims

In Column 24, Claim 1, Line 10, "$S1_a$-$M1_b$-$S3_a$-$M2_e$-$S2_c$;" should read --$S1_a$-$M1_b$-$S3_d$-$M2_e$-$S2_c$;--

Signed and Sealed this
Twenty-eighth Day of October, 2025

John A. Squires
*Director of the United States Patent and Trademark Office*